United States Patent
Saad et al.

(10) Patent No.: US 11,720,832 B2
(45) Date of Patent: *Aug. 8, 2023

(54) HIERARCHICAL MISSION MANAGEMENT

(71) Applicant: THE BOEING COMPANY, Chicago, IL (US)

(72) Inventors: Emad William Saad, Renton, WA (US); John Lyle Vian, Renton, WA (US); Ryan James Meuth, Phoenix, AZ (US); Donald C. Wunsch, II, Rolla, MO (US)

(73) Assignee: THE BOEING COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/903,696

(22) Filed: Jun. 17, 2020

(65) Prior Publication Data
US 2020/0334593 A1    Oct. 22, 2020

Related U.S. Application Data

(62) Division of application No. 12/573,392, filed on Oct. 5, 2009.

(51) Int. Cl.
| | |
|---|---|
| *G06Q 10/06* | (2023.01) |
| *G06Q 50/30* | (2012.01) |
| *G06Q 10/0631* | (2023.01) |
| *G06Q 10/067* | (2023.01) |
| *G05D 1/00* | (2006.01) |
| *B64F 5/60* | (2017.01) |

(52) U.S. Cl.
CPC ............. *G06Q 10/06* (2013.01); *B64F 5/60* (2017.01); *G05D 1/0088* (2013.01); *G06Q 10/067* (2013.01); *G06Q 10/06311* (2013.01); *G06Q 10/06316* (2013.01); *G06Q 50/30* (2013.01)

(58) Field of Classification Search
CPC .. G06Q 10/06; G06Q 10/06311; G06Q 10/67; G06Q 10/06316; G06Q 10/00; G06Q 30/02; B64F 5/60
See application file for complete search history.

(56) References Cited

U.S. PATENT DOCUMENTS

| | | | |
|---|---|---|---|
| 6,898,484 B2 * | 5/2005 | Lemelson | G05B 19/19 |
| | | | 700/262 |
| 8,812,154 B2 * | 8/2014 | Vian | G05D 1/0027 |
| | | | 700/258 |

(Continued)

OTHER PUBLICATIONS

Wang et al., Coverage Path Planning for Multiple Robotic Agent-Based Inspection of an Unknown 2D Environment, Jun. 1, 2009, 2009 17th Mediterranean Conference on Control and Automation, pp. 1295-1300 (Year: 2009).*

*Primary Examiner* — Robert D Rines
(74) *Attorney, Agent, or Firm* — The Small Patent Law Group LLC; Joseph M. Butscher

(57) ABSTRACT

The different advantageous embodiments further provide a system for hierarchical mission management comprising a number of mission planners, a data processing system, and a communication system. The number of mission planners are associated with a number of agent groups. The data processing system is configured to execute the number of mission planners. The communication system is configured to provide communication between the number of mission planners.

20 Claims, 13 Drawing Sheets

(56) References Cited

U.S. PATENT DOCUMENTS

| | | | | |
|---|---|---|---|---|
| 2002/0143601 | A1* | 10/2002 | Sinex | G06Q 10/06 |
| | | | | 705/7.21 |
| 2003/0089183 | A1* | 5/2003 | Jacobsen | B64F 5/30 |
| | | | | 73/865.8 |
| 2005/0251291 | A1* | 11/2005 | Solomon | F41H 13/00 |
| | | | | 700/245 |
| 2006/0091310 | A1* | 5/2006 | Furry | H04N 5/33 |
| | | | | 250/330 |
| 2007/0143169 | A1* | 6/2007 | Grant | G06Q 10/06313 |
| | | | | 705/7.14 |
| 2008/0039993 | A1* | 2/2008 | Cleary | G06N 5/02 |
| | | | | 701/32.7 |
| 2008/0217471 | A1* | 9/2008 | Liu | H02J 1/14 |
| | | | | 713/300 |
| 2010/0312387 | A1* | 12/2010 | Jang | G05B 19/41865 |
| | | | | 700/248 |
| 2012/0221190 | A1* | 8/2012 | Bell | G06Q 10/06 |
| | | | | 702/184 |
| 2019/0168892 | A1* | 6/2019 | Nissen | G06T 7/13 |

\* cited by examiner

HIERARCHICAL MISSION MANAGEMENT

RELATED APPLICATIONS

This application is a division of U.S. patent application Ser. No. 12/573,392, entitled "Hierarchical Mission Management," filed Oct. 5, 2009, now U.S. Pat. No. 10,810,519, which is hereby incorporated by reference in its entirety.

BACKGROUND INFORMATION

Field

The present disclosure relates generally to mission management and, in particular, to a hierarchical system for planning and executing a mission. Still more particularly, the present disclosure relates to a method and apparatus for planning and executing a mission using a hierarchical mission planning system.

Background

Automated mission management systems are typically presented as a single system that populates the same solution for a specific mission or operation. Mission management software requires complete information about the task requirements in order to optimize the resource allocation. General resource allocation methods search an entire population of agents to match agent capabilities with the task requirements provided for a mission. An agent may be any entity that is capable of action, such as, for example, robots, machines, vehicles, sensors, and/or humans. Additionally, the resource allocation algorithm used is run over all agents simultaneously. With a large population of agents, the computational expense of this resource allocation is increased proportionate to the agent population size and to the complexity of the task requirements. Incomplete information provided about the mission environment or task requirements may result in a mismatch between agent capability and the tasks assigned, leading to higher mission cost.

For example, in the aircraft maintenance field, various inspection techniques may be used to inspect objects, such as aircraft structures, following suspected events or to determine whether scheduled or preventative maintenance may be required. Existing aircraft maintenance operations may vary by owner and/or operator, but many may rely on costly customized manual methods of inspection and maintenance. Other existing operation techniques may rely on semi-autonomous or autonomous systems, which may provide limited solutions specific to the type of operation being performed. Allocating resources for various semi-autonomous or autonomous systems specific to a limited type of operation may be cost-prohibitive, time consuming, and inefficient.

Therefore, it would be advantageous to have a method and apparatus that takes into account one or more of the issues discussed above, as well as possibly other issues.

SUMMARY

The different advantageous embodiments provide a method for hierarchical mission management. A mission specification having a number of tasks is received. A number of agents associated with a number of different levels of a hierarchy is identified using a hierarchy specification. A number of mission planners associated with the number of different levels of the hierarchy is identified using the hierarchy specification. The mission specification is assigned to a first mission planner in the number of mission planners associated with a first level of the hierarchy.

The different advantageous embodiments further provide a system for hierarchical mission management comprising a number of mission planners, a data processing system, and a communication system. The number of mission planners is associated with a number of agent groups. The data processing system is configured to execute the number of mission planners. The communication system is configured to provide communication between the number of mission planners.

The different advantageous embodiments yet further provide a method for autonomous mission management. A mission specification is received at a first mission planner associated with a first level agent group. A number of first agents in the first level agent group is assigned to fulfill the mission specification. The number of first agents executing the mission is monitored using a data processing system. A determination is made as to whether the first level agent group will fulfill the mission specification. In response to a determination that the first level agent group will not fulfill the mission specification, the mission specification is communicated to a second mission planner associated with a second level agent group.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
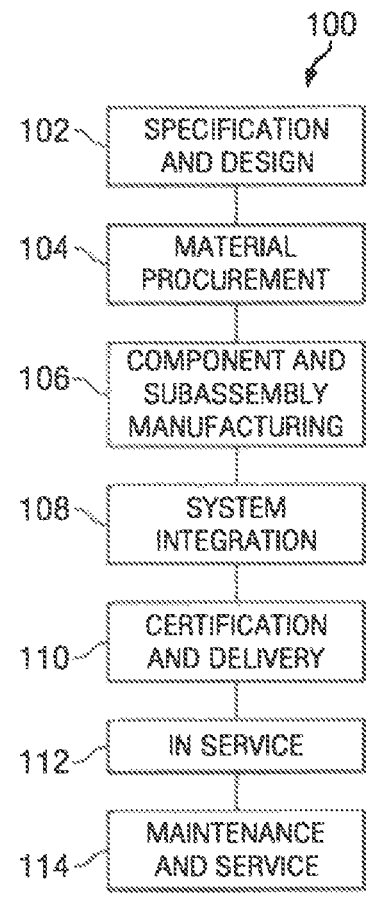
FIG. 1 is an illustration of an aircraft manufacturing and service method in accordance with an advantageous embodiment.
Figure 2:
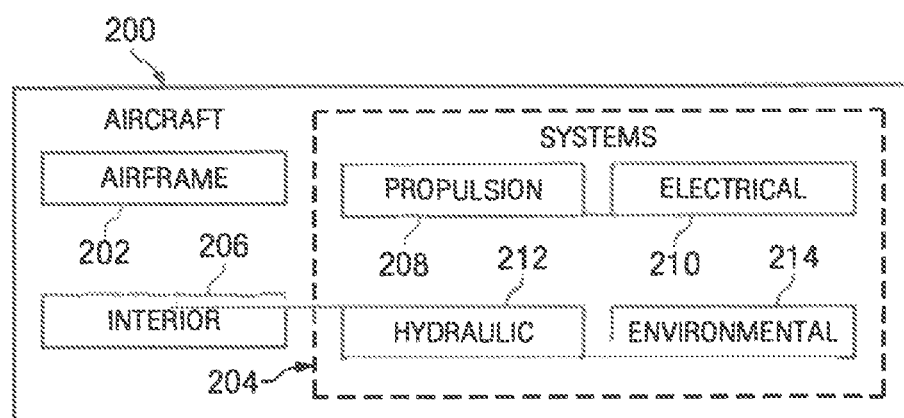
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry. Additionally, different advantageous embodiments may be applied to other infrastructure industries, such as bridges and buildings or other civilian or military applications.

Apparatus and methods embodied herein may be employed during any one or more of the stages of aircraft manufacturing and service method 100 in FIG. 1. For example, components or subassemblies produced in component and subassembly manufacturing 106 in FIG. 1 may be inspected while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the inspection and/or maintenance of aircraft 200.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments take into account and recognize that currently used mission planning systems may not provide continuous and/or periodic data needed to detect and monitor intermittent conditions. The different advantageous embodiments also recognize that existing mission planning methods may not autonomously coordinate multiple missions and/or multiple groups of agents executing heterogeneous operations.

The different advantageous embodiments further take into account and recognize that currently used resource allocation systems may not be robust enough for dynamically planning and coordinating multiple remote agent groups, each of which may be intermittently dispatched and recalled during a given mission. In addition, significant operator workload is required to maintain operations of such complex coupled systems of systems due to functional failure or other unexpected environmental or mission operating conditions.

The different advantageous embodiments further take into account and recognize that current mission management systems populate the same solution for a specific mission or operation. Current mission management software requires complete information about the task requirements in order to optimize the resource allocation. General resource allocation methods search an entire population of agents to match agent capabilities with the task requirements provided for a mission. Additionally, the resource allocation algorithm used is run over all agents simultaneously. With a large population of agents, the computational expense of this resource allocation is increased proportionate to the agent population size and to the complexity of the task requirements. Incomplete information provided about the mission environment or task requirements may result in a mismatch between agent capability and the tasks assigned, leading to higher mission cost.

Thus, one or more of the different advantageous embodiments provide a method for hierarchical mission management. A mission specification having a number of tasks is received. A number of agents associated with a number of different levels of a hierarchy is identified using a hierarchy specification. A number of mission planners associated with the number of different levels of the hierarchy is identified using the hierarchy specification. The mission specification is assigned to a first mission planner in the number of mission planners associated with a first level of the hierarchy.

The different advantageous embodiments further provide a system for hierarchical mission management comprising a number of mission planners, a data processing system, and a communication system. The number of mission planners are associated with a number of agent groups. The data processing system is configured to execute the number of mission planners. The communication system is configured to provide communication between the number of mission planners.

The different advantageous embodiments yet further provide a method for autonomous mission management. A mission specification is received at a first mission planner associated with a first level agent group. A number of first agents in the first level agent group is assigned to fulfill the mission specification. The number of first agents executing the mission is monitored using a data processing system. A determination is made as to whether the first level agent group will fulfill the mission specification. In response to a determination that the first level agent group will not fulfill the mission specification, the mission specification is communicated to a second mission planner associated with a second level agent group.

Figure 3:
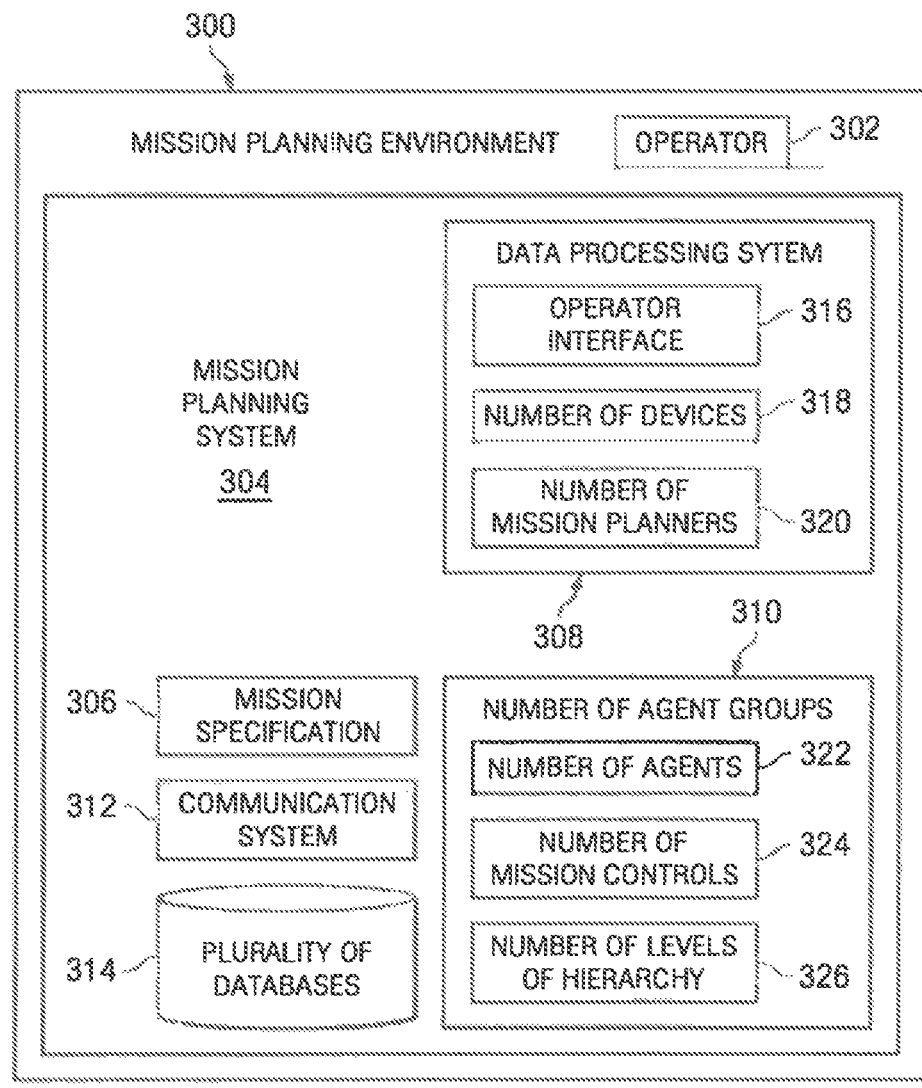
FIG. 3 is an illustration of a mission planning environment in accordance with an advantageous embodiment.

With reference now to FIG. 3, an illustration of a mission planning environment is depicted in accordance with an advantageous embodiment. Mission planning environment 300 may be any environment in which missions or operations are planned, executed, and modified using a number of agents and operator 302.

Mission planning system 304 is an example of a system used to plan an inspection mission to inspect aircraft 200 in FIG. 2 during maintenance and service 114 in FIG. 1, for example. Mission planning system 304 may be implemented in a number of industries for a number of applications. For example, mission planning system 304 may be implemented in the aerospace industry, automotive industry, military, law enforcement, first responders, search and rescue, surveillance, and/or any other suitable industry and/or application that may utilize planning systems.

Operator 302 may be, without limitation, a human operator, an autonomous machine operator, a robotic operator, or some other external system. Operator 302 may provide mission specification 306 to mission planning system 304. Mission planning system 304 includes data processing system 308, number of agent groups 310, and communication system 312. As used herein, number of agent groups refers to one or more agent groups. Mission planning system 304 includes plurality of databases 314 in the illustrative examples. In one advantageous embodiment, mission specification 306 may be retrieved from plurality of databases 314. Plurality of databases 314 may include a number of databases distributed across a number of network environments that may be accessed by mission planning system 304.

Data processing system 308 may include operator interface 316, number of devices 318, and number of mission planners 320. As used herein, number of refers to one or more items, such as one or more devices and/or one or more mission planners, for example. Data processing system 308 may be capable of generating information. Information may include, for example, without limitation, commands, data, programs, and/or other suitable types of information.

Operator 302 may use number of devices 318 to interact with operator interface 316. Number of devices 318 may include devices such as, without limitation, a display, dataglove, a personal digital assistant, a laptop, a joystick, a keyboard, a mouse, a touchscreen, an optical interface, a visual interface, a tactile interface, and/or any other suitable device. Operator 302 may use operator interface 316 to access number of mission planners 320 on data processing system 308. Number of mission planners 320 may plan missions and allocate resources accordingly. A mission may be, for example, without limitation, an inspection of a structure, a search and rescue operation, a surveillance mission, a maintenance operation, an area coverage operation, and/or any other suitable mission or operation. A mission planner is a process that executes on a data processing system, such as data processing system 308, for example.

In one advantageous embodiment, operator 302 may initiate a mission planning task using operator interface 316 on data processing system 308. For example, operator 302 may identify a specific task or mission for mission planning system 304 to execute. The specific task or mission in this example may be defined by mission specification 306. Operator 302 may be local to number of agent groups 310 or may be very remote from number of agent groups 310. For example, number of agent groups 310 may be in a different location, country, or planet than operator 302, such as a number of agents deployed on the moon and being tasked with mission specification 306 by operator 302 from the earth.

Number of agent groups 310 includes number of agents 322, number of mission controls 324, and number of levels of hierarchy 326. Number of agents 322 may include, for example, without limitation, robots, machines, vehicles, sensors, humans, and/or any other suitable type of agent. Number of agents 322 may be, without limitation, mobile, static, autonomous, and/or semi-autonomous. Each agent group in number of agent groups 310 includes a different number of agents from number of agents 322. Each agent in number of agents 322 is assigned to one of number of levels of hierarchy 326 based on the capabilities of the agent. In turn, each agent group in number of agent groups 310 corresponds to an individual level of hierarchy of number of levels of hierarchy 326. Each agent group in number of agent groups 310 includes an individual mission control from number of mission controls 324.

In an advantageous embodiment, number of mission planners 320 generates a mission plan for number of agent groups 310 using mission specification 306. The mission plan generated by number of mission planners 320 may be transmitted to number of mission controls 324 of number of agent groups 310 using communication system 312. Communication system 312 provides communication between number of mission planners 320 and number of agent groups 310. Communication system 312 may provide communications through the use of either or both physical and wireless communications links.

The illustration of mission planning environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, number of mission planners 320 may receive mission specification 306 from plurality of databases 314 initiating a scheduled mission or operation. A scheduled mission or operation may be a routine operation or scheduled mission that is initiated by a date, time, or event recognized by plurality of databases 314. For example, routine maintenance on aircraft 200 in FIG. 2 may be initiated by a date, such as an annual maintenance date for example, stored in plurality of databases 314.

Figure 4:
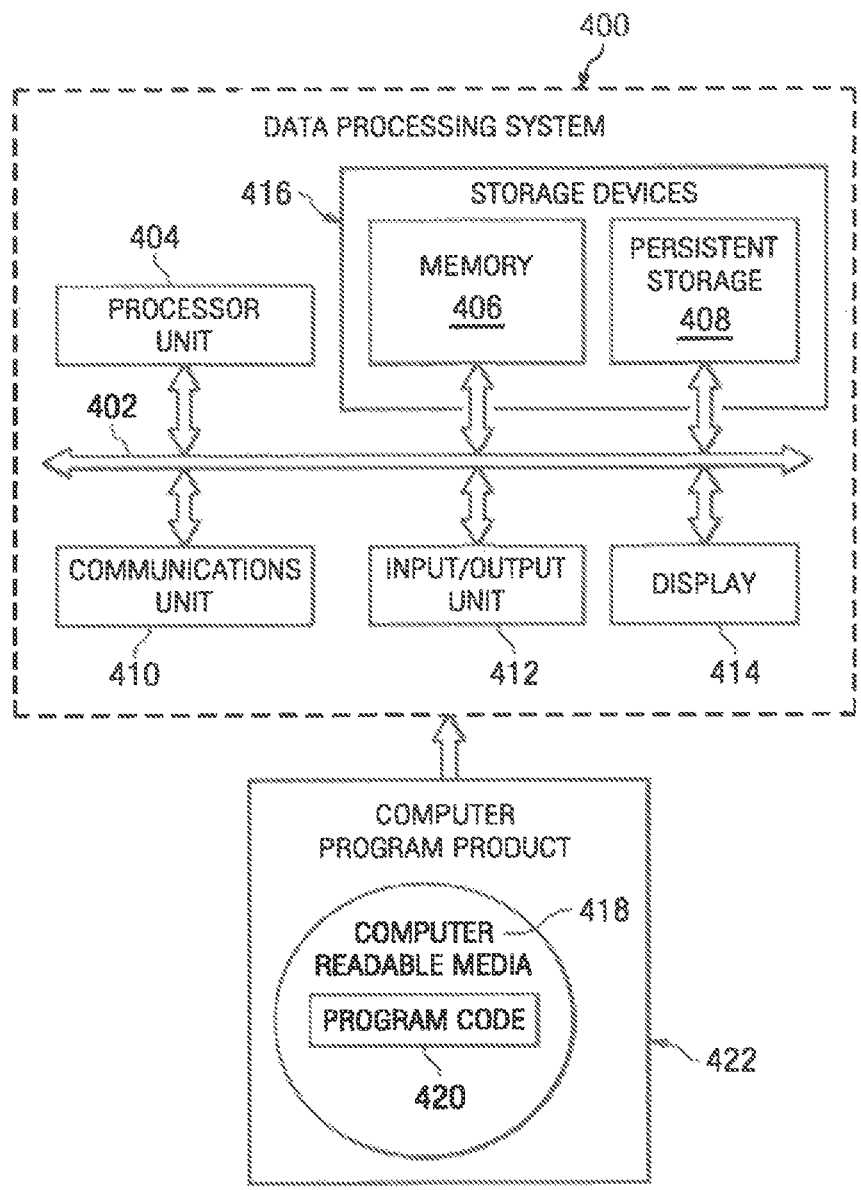
FIG. 4 is an illustration of a data processing system in accordance with an advantageous embodiment.

With reference now to FIG. 4, an illustration of a data processing system is depicted in accordance with an illustrative embodiment. Data processing system 400 may be used to implement different computers and data processing systems within a mission planning environment, such as mission planning system 304 and/or data processing system 308 in FIG. 3.

In this illustrative example, data processing system 400 includes communications fabric 402, which provides communications between processor unit 404, memory 406, persistent storage 408, communications unit 410, input/output (I/O) unit 412, and display 414. Depending on the particular implementation, different architectures and/or configurations of data processing system 400 may be used.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device may be any piece of hardware that may be capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 may be a network interface card. Communications unit 410 may provide communications through the use of either or both physical and wireless communications links. Communications unit 410 may be used to implement communication system 312 in FIG. 3, for example.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instruction are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 420 may be located in a functional form on computer readable media 418 that may be selectively removable and may be loaded onto or transferred to data processing system 400 for execution by processor unit 404. Program code 420 and computer readable media 418 form computer program product 422 in these examples. In one example, computer readable media 418 may be in a tangible form, such as, for example, an optical or magnetic disc that may be inserted or placed into a drive or other device that may be part of persistent storage 408 for transfer onto a storage device, such as a hard drive that may be part of persistent storage 408. In a tangible form, computer readable media 418 also may take the form of a persistent storage, such as a hard drive, a thumb drive, or a flash memory that may be connected to data processing system 400. The tangible form of computer readable media 418 may also be referred to as computer recordable storage media. In some instances, computer readable media 418 may not be removable.

Alternatively, program code 420 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 420 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 420 may be a server computer, a client computer, or some other device capable of storing and transmitting program code 420.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 may be any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
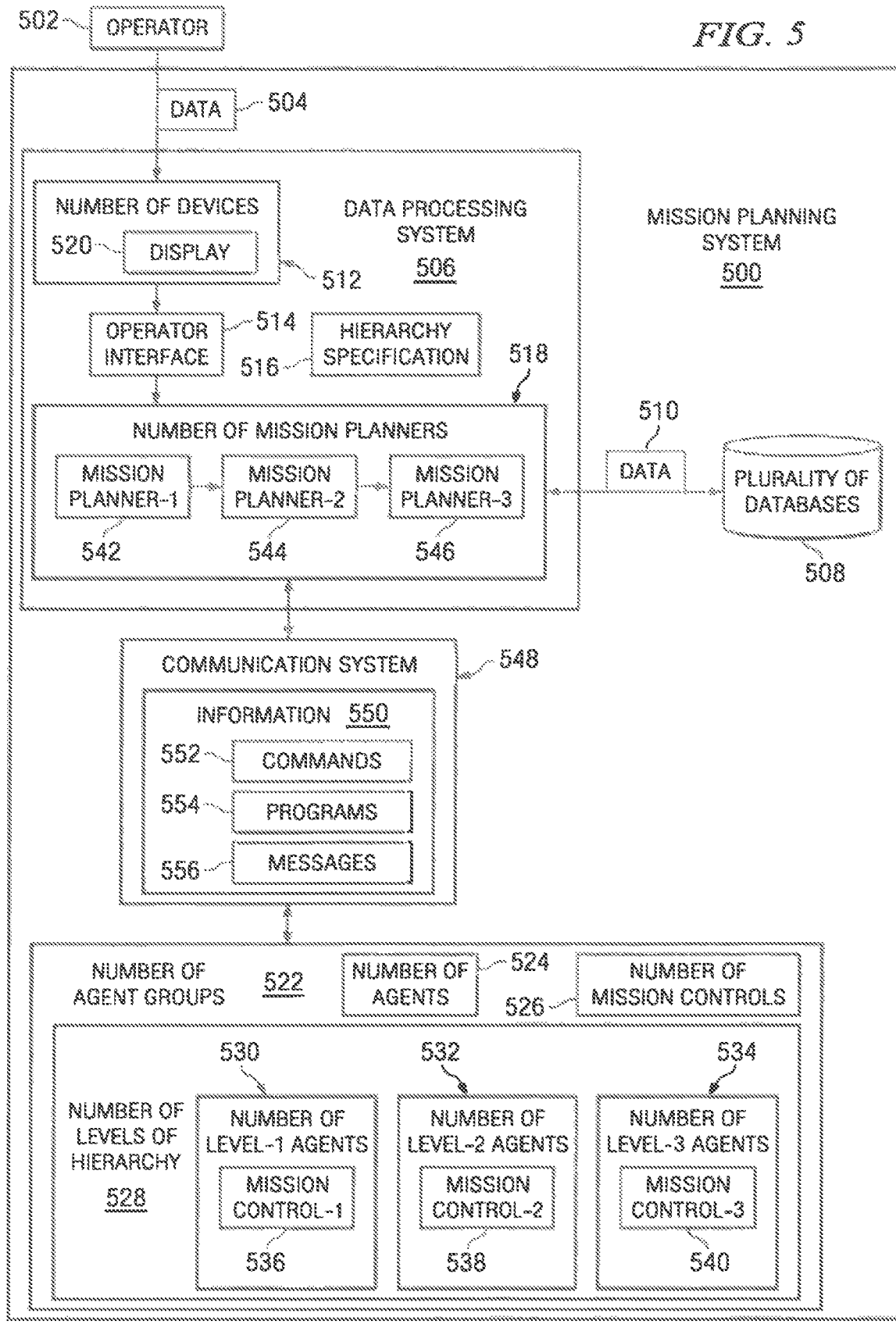
FIG. 5 is an illustration of a mission planning system in accordance with an advantageous embodiment.

With reference now to FIG. 5, an illustration of a mission planning system is depicted in accordance with an advantageous embodiment. Mission planning system 500 may be an illustrative example of one implementation of mission planning system 304 in FIG. 3.

Operator 502 may provide data 504 to data processing system 506. Data 504 may be an illustrative example of one implementation of mission specification 306 in FIG. 3. Mission planning system 500 may also include plurality of databases 508 in some advantageous embodiments. In one advantageous embodiment, data 510 may be retrieved from plurality of databases 508. Plurality of databases 508 may include a number of databases distributed across a number of network environments that may be accessed by mission planning system 500. In one illustrative example, data 510 may be a mission specification, such as mission specification 306 in FIG. 3.

In another illustrative example, data 510 may be additional information used to generate a mission plan, such as, for example, without limitation, object identification information, object maintenance information, object reliability and maintainability information, engineering and material management information, object planning and control information, prior mission data, machine control information, mission process information, weather information, resource availability information, geo-location reference information, terrain mapping data, rules of engagement information, and/or any other suitable information.

Data processing system 506 includes number of devices 512, operator interface 514, hierarchy specification 516, and number of mission planners 518. As used herein, number of refers to one or more items, such as one or more devices and/or one or more mission planners, for example. Operator 502 may use number of devices 512 to interact with operator interface 514. Number of devices 512 may include devices such as, without limitation, a display, data-glove, a personal digital assistant, a laptop, a joystick, a keyboard, a mouse, a touchscreen, an optical interface, a visual interface, a tactile interface, and/or any other suitable device. Display 520 may be an example of one type of device in number of devices 512 used by operator 502 to interact with operator interface 514.

Hierarchy specification 516 describes the capabilities and assigned hierarchical level of each agent in number of agent groups 522. Hierarchy specification 516 includes information such as, without limitation, the number of levels in the hierarchy, and the number of agents in each level of the hierarchy. Hierarchy specification 516 may also specify what type of information that an agent in a particular level of the hierarchy can access in plurality of databases 508. For example, agents in one level of the hierarchy may not have access to weather information but only have access to area maps, while agents in another level of the hierarchy may have access to a limited subset of area maps. Hierarchy specification 516 may be used by number of mission planners 518 to generate a mission plan that meets the requirements of a mission specification, such as mission specification 306 in FIG. 3.

In one advantageous embodiment, operator 502 may initiate a mission planning task using operator interface 514 on data processing system 506. For example, operator 502 may identify a specific task or mission for mission planning system 500 to execute. The specific task or mission in this example may be defined by a mission specification received in data 504. Number of mission planners 518 may receive data 504 and generate a mission plan to be executed by number of agent groups 522.

Number of agent groups 522 includes number of agents 524, number of mission controls 526, and number of levels of hierarchy 528. Number of agents 524 may be an illustrative example of one implementation of number of agents 322 in FIG. 3. Each agent group in number of agent groups 522 includes a different number of agents from number of agents 524. Each agent in number of agents 524 is assigned to one of number of levels of hierarchy 528 based on the capabilities of the agent, as defined in hierarchy specification 516. Each agent group in number of agent groups 522 also includes an individual mission control from number of mission controls 526. Number of mission controls 526 may represent the individual mission controls for each agent group in number of agent groups 522. Each agent group may have its own individual mission control.

In this illustrative example, number of agents 524 are assigned to number of levels of hierarchy 528 as number of level-1 agents 530, number of level-2 agents 532, and number of level-3 agents 534. Number of level-1 agents 530 includes mission control-1 536, number of level-2 agents 532 includes mission control-2 538, and number of level-3 agents 534 includes mission control-3 540.

Number of mission planners 518 may include mission planner-1 542, mission planner-2 544, and mission planner-3 546. Mission planner-1 542 is associated with number of level-1 agents 530. Mission planner-2 544 is associated with number of level-2 agents 532. Mission planner-3 546 is associated with number of level-3 agents 534.

Number of mission planners 518 may transmit mission plans using communication system 548. Communication system 548 may receive and transmit information 550 between number of mission planners 518 and number of agent groups 522. Information 550 may include commands 552 and programs 554 which are transmitted to a mission control of the designated agent group, such as mission control-1 536 of number of level-1 agents 530. During execution of a mission plan, number of mission controls 526 may send messages 556 to number of mission planners 518.

Messages 556 may be sent, for example, by mission control-1 536 to mission planner-1 542 if mission control-1 536 can not resolve a conflict in number of level-1 agents 530 that may hinder execution of the mission plan. Mission planner-1 542 may use messages 556 to modify the mission plan in order to resolve the conflict identified by mission control-1 536. Mission planner-1 542 may then send new commands or programs to mission control-1 536 to execute a modified mission plan, or may generate a number of sub-tasks to send to mission planner-2 544 for execution by number of level-2 agents 532, for example.

In one advantageous embodiment, mission planner-1 542 may receive data 504 from operator 502 using operator interface 514 to initiate a mission or operation. Data 504 may include, without limitation, a mission specification with information about a number of tasks, an objective, a structure, and/or any other suitable information for a mission or operation. Mission planner-1 542 may receive data 504, and/or data 510, and may process the information received to generate a mission plan that allocates a number of tasks to number of level-1 agents 530. The mission plan generated by mission planner-1 542 may be transmitted to mission control-1 536 for number of level-1 agents 530 using communication system 548. Mission planner-1 542 may monitor the mission or operation during execution and may modify the mission or operation based on feedback received from number of level-1 agents 530.

The illustration of mission planning system 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
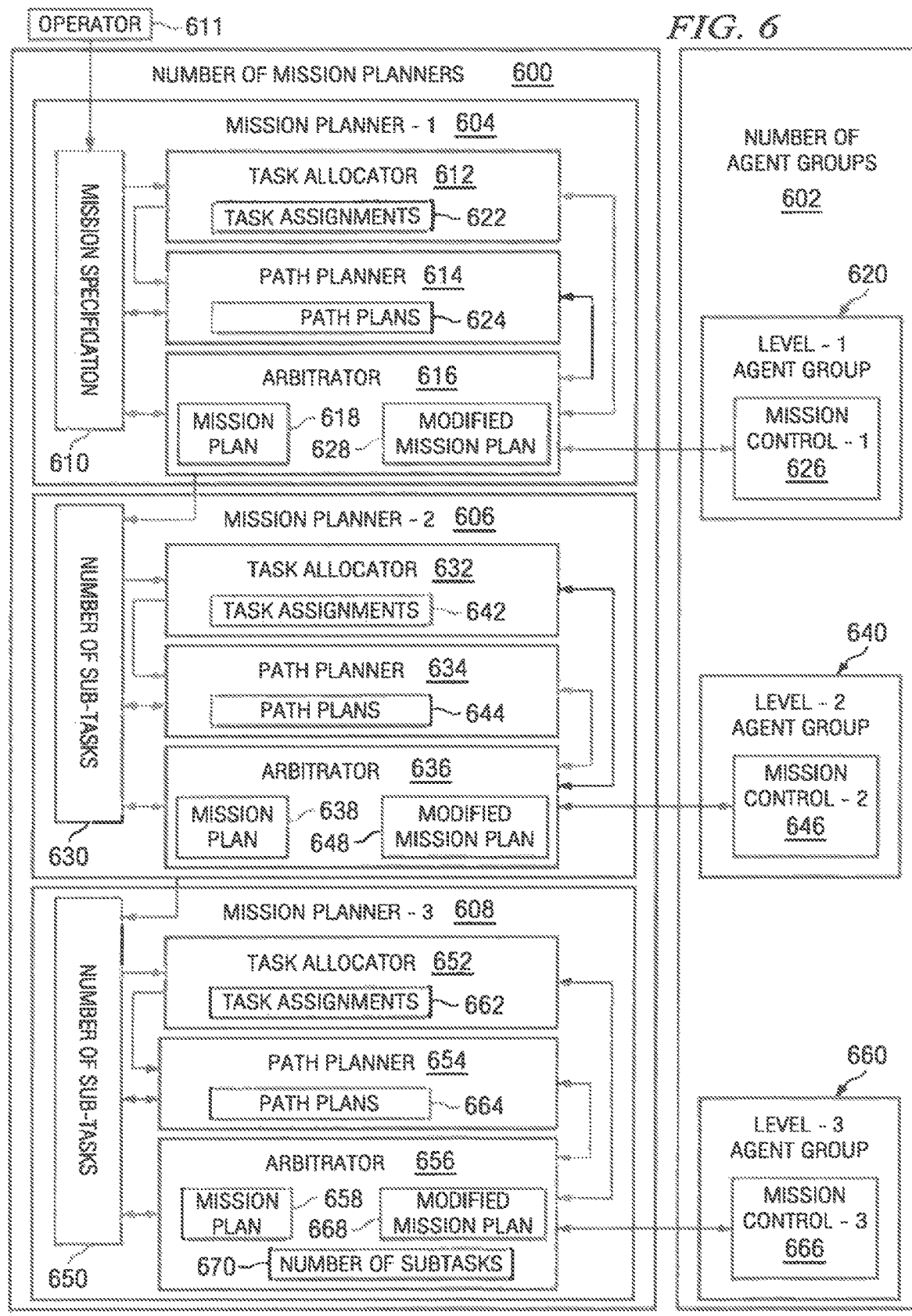
FIG. 6 is an illustration of a number of mission planners in accordance with an advantageous embodiment.

With reference now to FIG. 6, an illustration of a number of mission planners is depicted in accordance with an advantageous embodiment. Number of mission planners 600 may be an illustrative example of one implementation of number of mission planners 320 in FIG. 3 and/or number of mission planners 518 in FIG. 5.

Number of mission planners 600 are configured to interact with number of agent groups 602. Number of agent groups 602 may be an illustrative example of one implementation of number of agent groups 310 in FIG. 3 and/or number of agent groups 522 in FIG. 5.

Number of mission planners 600 may include mission planner-1 604, mission planner-2 606, and mission planner-3 608. Each mission planner in number of mission planners 600 includes a task allocator, a path planner, and an arbitrator. Mission planner-1 604 may receive mission specification 610 from operator 611 via an operator interface, such as operator interface 514 in FIG. 5, for example. Mission planner-1 604 includes task allocator 612, path planner 614, and arbitrator 616.

Arbitrator 616 uses mission specification 610 to generate mission plan 618. Mission plan 618 includes a number of tasks. As used herein, a number of tasks refers to one or more tasks. Arbitrator 616 sends mission plan 618 to task allocator 612 and path planner 614. Task allocator 612 allocates the number of tasks for mission plan 618 to a number of agents in level-1 agent group 620, forming task assignments 622. Path planner 614 uses mission plan 618 and task assignments 622 to plan a physical path plan for each agent in level-1 agent group 620 executing the number of tasks in mission plan 618, forming path plans 624. Each agent in an agent group receives a path plan associated with the number of tasks allocated to that agent. Arbitrator 616 then sends task assignments 622 and path plans 624 to mission control-1 626 of level-1 agent group 620.

Arbitrator 616 monitors level-1 agent group 620 during execution of mission plan 618. A number of agents of level-1 agent group 620 may provide information about the environment in which mission plan 618 is being executed and/or the individual agents of level-1 agent group 620. This information provided by level-1 agent group 620 may be used by arbitrator 616 to make decisions and determine whether mission plan 618 needs to be modified or re-planned. If arbitrator 616 determines that mission plan 618 requires re-planning, arbitrator 616 may generate modified mission plan 628 and/or number of sub-tasks 630. Modified mission plan 628 is sent to task allocator 612 and path planner 614 to generate modified task assignments and modified path plans, which are then sent to mission-control-1 626 for execution by level-1 agent group 620.

Number of sub-tasks 630 are sent by arbitrator 616 of mission planner-1 604 to mission planner-2 606. Mission planner-2 606 includes task allocator 632, path planner 634, and arbitrator 636. Arbitrator 636 uses number of sub-tasks 630 to generate mission plan 638. Mission plan 638 includes a number of tasks. Arbitrator 636 sends mission plan 638 to task allocator 632 and path planner 634. Task allocator 632 allocates the number of tasks for mission plan 638 to a number of agents in level-2 agent group 640, forming task assignments 642. Path planner 634 uses mission plan 638 and task assignments 642 to plan a physical path plan for each agent in level-2 agent group 640 executing the number of tasks in mission plan 638, forming path plans 644. Arbitrator 636 then sends task assignments 642 and path plans 644 to mission control-2 646 of level-2 agent group 640.

Arbitrator 636 monitors level-2 agent group 640 during execution of mission plan 638. A number of agents of level-2 agent group 640 may provide information about the environment in which mission plan 638 is being executed and/or the individual agents of level-2 agent group 640. This information provided by level-2 agent group 640 may be used by arbitrator 636 to make decisions and determine whether mission plan 638 needs to be modified or re-planned. If arbitrator 636 determines that mission plan 638 requires re-planning, arbitrator 636 may generate modified mission plan 648 and/or number of sub-tasks 650. Modified mission plan 648 is sent to task allocator 632 and path planner 634 to generate modified task assignments and modified path plans, which are then sent to mission-control-2 646 for execution by level-2 agent group 640.

Number of sub-tasks 650 are sent by arbitrator 636 of mission planner-2 606 to mission planner-3 608. Mission planner-3 608 includes task allocator 652, path planner 654, and arbitrator 656. Arbitrator 656 uses number of sub-tasks 650 to generate mission plan 658. Mission plan 658 includes a number of tasks. Arbitrator 656 sends mission plan 658 to task allocator 652 and path planner 654. Task allocator 652 allocates the number of tasks for mission plan 658 to a number of agents in level-3 agent group 660, forming task assignments 662. Path planner 654 uses mission plan 658 and task assignments 662 to plan a physical path plan for each agent in level-3 agent group 660 executing the number of tasks in mission plan 658, forming path plans 664. Arbitrator 656 then sends task assignments 662 and path plans 664 to mission control-3 666 of level-3 agent group 660.

Arbitrator 656 monitors level-3 agent group 660 during execution of mission plan 658. A number of agents of level-3 agent group 660 may provide information about the environment in which mission plan 658 is being executed and/or the individual agents of level-3 agent group 660. This information provided by level-3 agent group 660 may be used by arbitrator 656 to make decisions and determine whether mission plan 658 needs to be modified or re-planned. If arbitrator 656 determines that mission plan 658 requires re-planning, arbitrator 656 may generate modified mission plan 668 and/or number of sub-tasks 670. Modified mission plan 668 is sent to task allocator 652 and path planner 654 to generate modified task assignments and modified path plans, which are then sent to mission-control-3 666 for execution by level-3 agent group 660.

Number of sub-tasks 670 are sent by arbitrator 656 of mission planner-3 608 to a next level mission planner, and so on, until mission specification 610 is completed and/or a determination is made that mission specification 610 cannot be completed by number of agent groups 602.

The illustration of number of mission planners 600 and number of agent groups 602 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, any additional number of mission planners and/or agent groups may be available in a mission planning environment, such as mission planning environment 300 in FIG. 3. The process may iteratively continue down a hierarchy of agents until the mission specification is completed.

Figure 7:
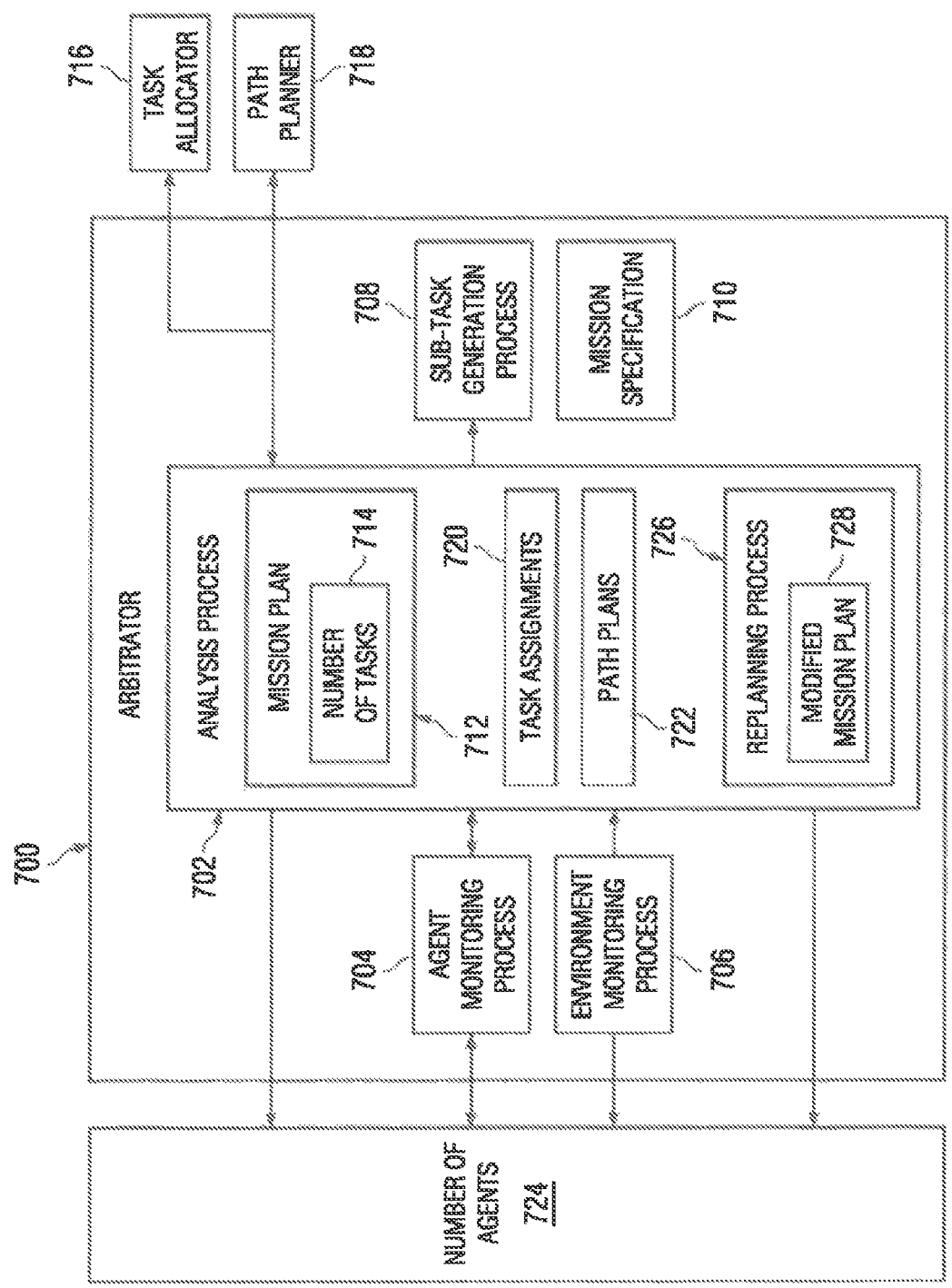
FIG. 7 is an illustration of an arbitrator in accordance with an advantageous embodiment.

With reference now to FIG. 7, an illustration of an arbitrator is depicted in accordance with an advantageous embodiment. Arbitrator 700 may be an illustrative example of one implementation of arbitrator 616 in FIG. 6.

Arbitrator 700 may include analysis process 702, agent monitoring process 704, environment monitoring process 706, and sub-task generation process 708. Analysis process 702 may use mission specification 710, received from an operator or database for example, to generate mission plan 712. Mission plan 712 may include number of tasks 714. Arbitrator 700 may send number of tasks 714 to task allocator 716 and path planner 718. Task allocator 716 may be an illustrative example of task allocator 612 in FIG. 6. Path planner 718 may be an illustrative example of path planner 614 in FIG. 6.

Analysis process 702 may receive task assignments 720 from task allocator 716, and path plans 722 from path planner 718. Arbitrator 700 provides task assignments 720 and path plans 722 to number of agents 724. Arbitrator 700 then uses agent monitoring process 704 and environment monitoring process 706 to monitor number of agents 724 executing task assignments 720 along path plans 722.

Number of agents 724 may send information, such as, without limitation, sensor data, to agent monitoring process 704 and/or environment monitoring process 706. Agent monitoring process 704 uses information received from number of agents 724 to monitor, for example, without limitation, the agent capability, agent status, agent health, agent power availability, and/or any other suitable agent characteristic of number of agents 724. Environment monitoring process 706 uses information received from number of agents 724 and/or other sources, such as plurality of databases 508 in FIG. 5, to monitor, for example, without limitation, changes in the environment around number of agents 724, discovery of a new task by number of agents 724, and/or any other suitable information that affects the mission performance.

In an illustrative example, agent monitoring process 704 may use data-clustering to categorize number of agents 724. Likewise, environment monitoring process 706 may use data-clustering to categorize a number of locations in the environment around number of agents 724. Data-clustering may utilize a sensitivity parameter to determine how similar an agent and/or location must be to belong to a given category, for example. For example, for a given level of sensitivity, an update from agent monitoring process 704 may cause an agent in number of agents 724 to change categories. In another example, a new category may be added by environment monitoring process 706. When analysis process 702 receives a category update or addition, analysis process 702 may initiate re-planning process 726 to determine if the changed parameters affect mission plan 712. The sensitivity parameter employed by agent monitoring process 704 and/or environment monitoring process 706 may mitigate small changes caused by observed noise from initiating continual re-planning, thereby conserving computational resources.

When new information is detected by arbitrator 700 using agent monitoring process 704 and/or environment monitoring process 706, the new information may be transmitted to analysis process 702. Analysis process 702 uses re-planning process 726 to determine whether a re-plan is needed for mission plan 712. In one illustrative example when re-planning is required, re-planning process 726 may generate modified mission plan 728. In another illustrative example when re-planning is required, re-planning process 726 may trigger sub-task generation process 708 to generate a number of sub-tasks for a mission planner at the next level in a hierarchy.

Figure 8:
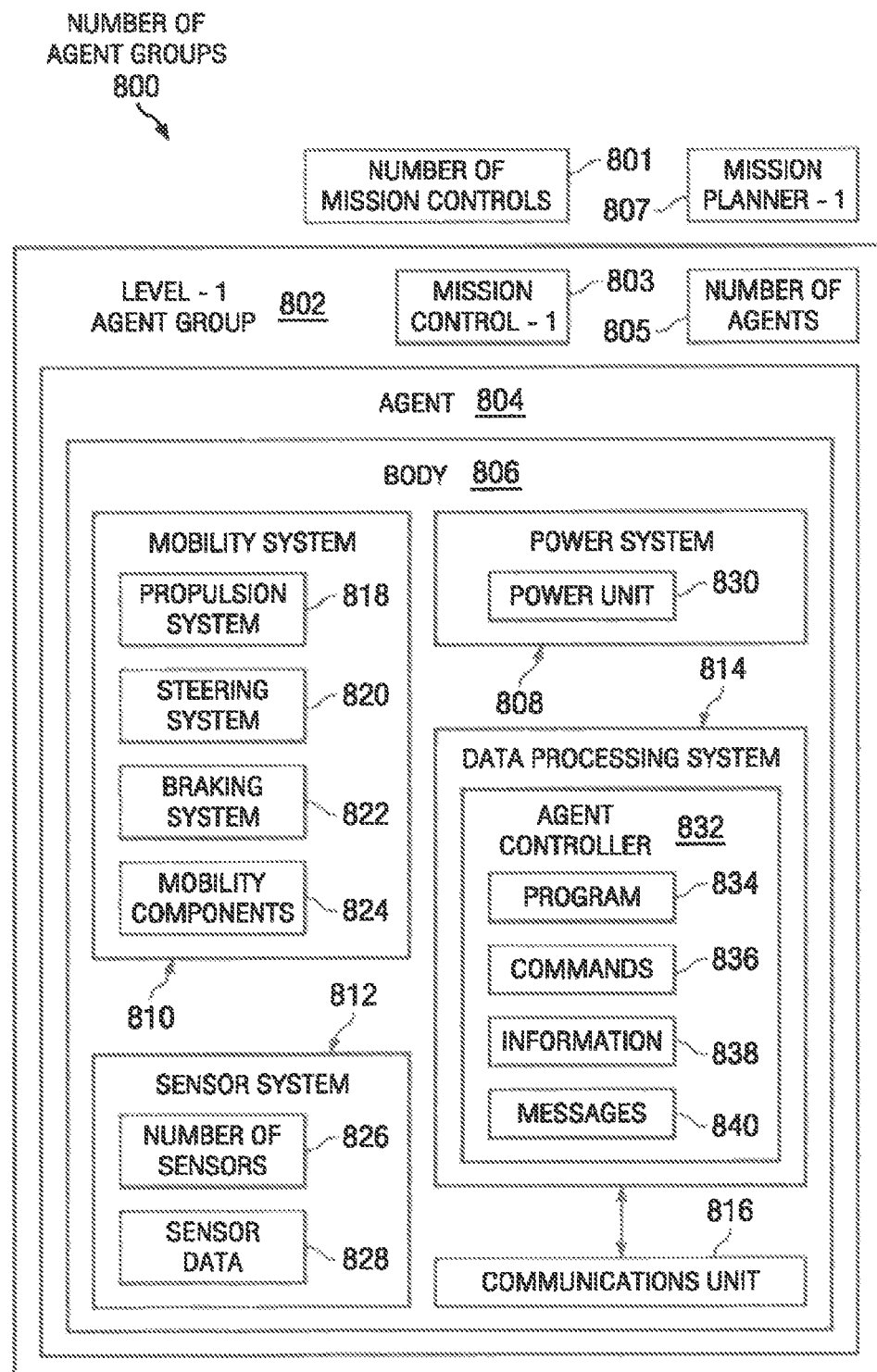
FIG. 8 is an illustration of a number of agent groups in accordance with an advantageous embodiment.

With reference now to FIG. 8, an illustration of a number of agent groups is depicted in accordance with an advantageous embodiment. Number of agent groups 800 may be an example of one manner in which number of agent groups 310 in FIG. 3 may be implemented.

Number of agent groups 800 may include number of mission controls 801. Each agent group in number of agent groups 800 may have its own mission control capable of receiving information from an associated mission planner, such as mission control-1 536 associated with mission planner-1 542 in FIG. 5. Level-1 agent group 802 may be an example of one implementation of an agent group in number of agent groups 800. Level-1 agent group 802 may include mission control 803 and number of agents 805. Mission control 803 may receive information directed to level-1 agent group 802 from mission planner-1 807 associated with level-1 agent group 802, and transmit messages from level-1 agent group 802 to mission planner-1 807.

Mission control-1 803 may monitor the progress of a mission or operation tasked to level-1 agent group 802, the interaction between number of agents 805 within level-1 agent group 802, and the status of each agent in number of agents 805. Mission control-1 803 may gather information while monitoring the progress of a mission or operation and the individual machines. The information gathered may indicate a conflict in the mission plan, which mission control-1 803 may be capable of solving. Mission control-1 803 may run a negotiation algorithm to determine whether a solution is available locally, and if a solution is available locally, may generate a number of commands to number of agents 805 to implement the solution. If a solution is not available locally, mission control-1 803 may send a message to mission planner-1 807 with the information about the conflict in the mission plan. Mission planner-1 807 may be an example of one implementation of mission planner-1 542 in FIG. 5.

Agent 804 may be an example of one agent in number of agents 805. Agent 804 may be, for example, without limitation, a robot, machine, vehicle, sensor, human, and/or any other suitable type of agent. Agent 804 may include, without limitation, body 806, power system 808, mobility system 810, sensor system 812, data processing system 814, communications unit 816, and/or other suitable components.

Body 806 may provide a structure and/or housing for which different components may be located on and/or in agent 804. Power system 808 may provide power to operate agent 804. Power system 808 may generate power using power unit 830. Power unit 830 may be rechargeable, removable and/or replaceable. Power unit 830 may be changed when power unit 830 becomes depleted. Power unit 830 may be, for example, without limitation, a battery and/or some other suitable type of power unit. For example, power unit 830 may be a wireless transfer unit capable of receiving power without using wires.

Mobility system 810 may provide mobility for agent 804. Mobility system 810 may take various forms. Mobility system 810 may include, for example, without limitation, propulsion system 818, steering system 820, braking system 822, and mobility components 824. In these examples, propulsion system 818 may propel or move agent 804 in response to commands from agent controller 832 in data processing system 814.

Propulsion system 818 may maintain or increase the speed at which agent 804 moves in response to instructions received from agent controller 832 in data processing system 814. Propulsion system 818 may be an electrically controlled propulsion system. Propulsion system 818 may be, for example, without limitation, an internal combustion engine, an internal combustion engine/electric hybrid system, an electric engine, or some other suitable propulsion system.

Steering system 820 may control the direction or steering of agent 804 in response to commands received from agent controller 832 in data processing system 814. Steering system 820 may be, for example, without limitation, an electrically controlled hydraulic steering system, an electrically driven rack and pinion steering system, a differential steering system, or some other suitable steering system.

Braking system 822 may slow down and/or stop agent 804 in response to commands received from agent controller 832 in data processing system 814. Braking system 822 may be an electrically controlled braking system. This braking system may be, for example, without limitation, a hydraulic braking system, a friction braking system, or some other suitable braking system that may be electrically controlled.

Mobility components 824 may provide agent 804 with the capability to move in a number of directions and/or locations in response to instructions received from agent controller 832 in data processing system 814 and executed by propulsion system 818, steering system 820, and braking system 822. Mobility components 824 may be, for example, without limitation, wheels, tracks, feet, rotors, propellers, wings, and/or other suitable components.

Sensor system 812 may include number of sensors 826 and sensor data 828. For example, number of sensors 826 may include, without limitation, a camera, a scanner, an electromechanical fatigue sensor, a microelectromechanical system (MEMS) device, and/or some other suitable type of sensor, as shown in more illustrative detail in FIG. 9. Sensor data 828 may be information collected by number of sensors 826.

Data processing system 814 may control the operation of agent 804 using agent controller 832 to execute program 834 and transmit commands 836 in these examples. Program 834 may be received from mission planner-1 807 through communications unit 816 and/or some other source. In these illustrative examples, communications unit 816 may provide the capability to transfer information, such as program 834 and commands 836, between agent 804 and other agents within level-1 agent group 802.

In one advantageous embodiment, program 834 and commands 836 are illustrative examples of programs 554 and commands 552 in FIG. 5, generated by number of mission planners 518 and transmitted over communications system 548 to number of agent groups 522 in FIG. 5. In another advantageous embodiment, program 834 and commands 836 may be generated by data processing system 814 based on information 838 received through communications unit 816 and/or some other source. Information 838 may be, for example, information about routine operations or planned missions, such as, for example, without limitation, maintenance requirements for a structure.

Data processing system 814 further receives sensor data 828 from sensor system 812 and generates messages 840. Messages 840 may be transmitted through communications unit 816 to another agent within level-1 agent group 802 or another component and/or device in mission planning environment 300 in FIG. 3.

The illustration of number of agent groups 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, agent controller 832 may be unnecessary. Agent controller 832 may be unnecessary if data processing system 814 directly receives programs 834 and commands 836 from mission planner-1 807, for example. In yet other advantageous embodiments, agent 804 may include additional systems not depicted here for operations such as, without limitation, inspection, maintenance, surveillance, search and rescue, and/or any other suitable operation or mission.

Figure 9:
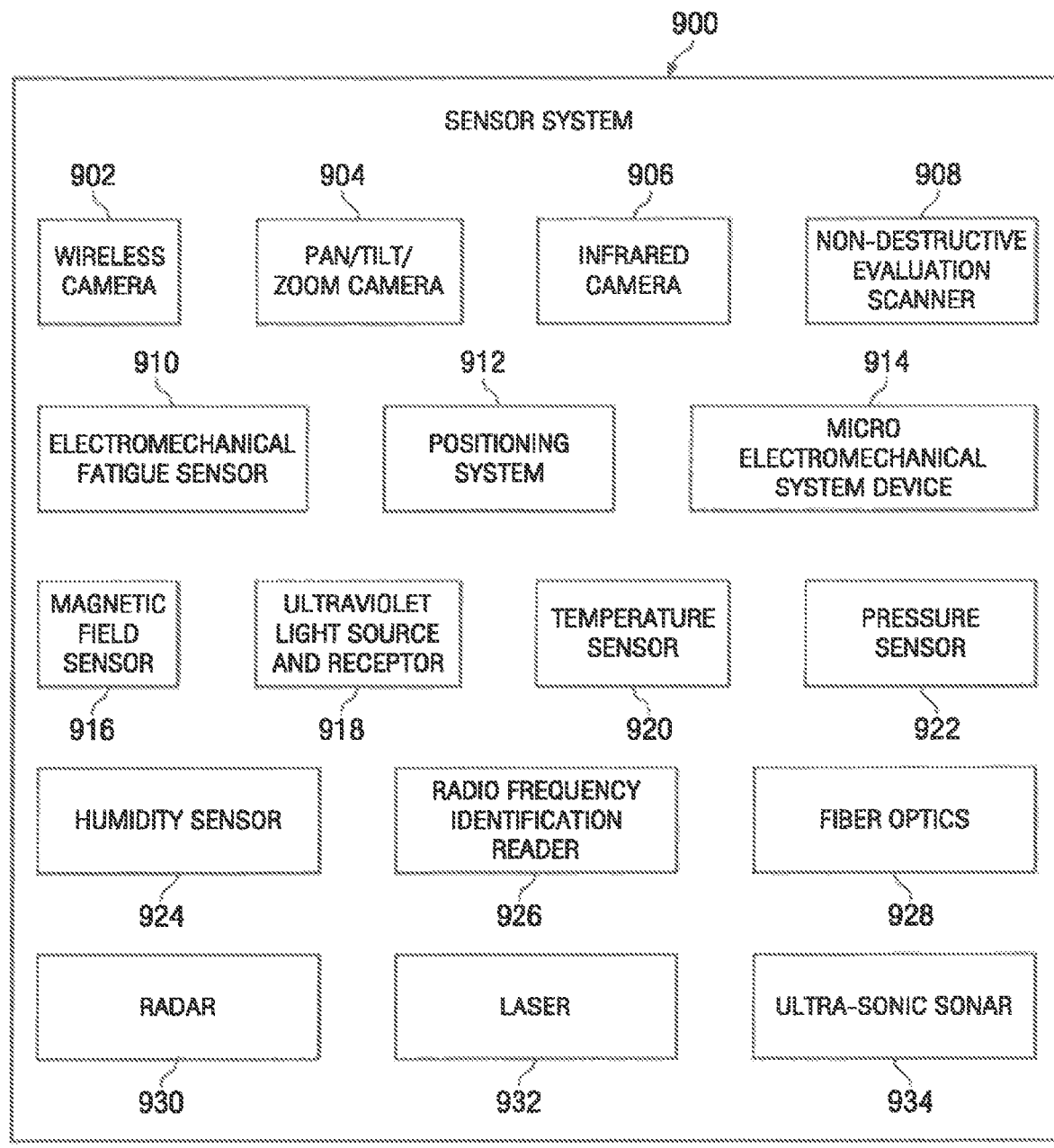
FIG. 9 is an illustration of a sensor system in accordance with an advantageous embodiment.

With reference now to FIG. 9, an illustration of a sensor system is depicted in accordance with an advantageous embodiment. Sensor system 900 may be an example of one implementation of sensor system 812 in FIG. 8.

Sensor system 900 may be located on a number of agents, such as number of agents 805 in level-1 agent group 802 of FIG. 8. Sensor system 900 may detect parameters such as, for example, without limitation, visual information, temperature information, humidity information, radiation outside the visual spectrum, structural frequency response information, non-visible light source reflection, air pressure, fluid pressure, gaseous pressures, strain or amount of deflection in a component, environmental factors, agent health, agent status, agent capabilities, and/or any other suitable parameter.

Sensor system 900 may include wireless camera 902, pan/tilt/zoom camera 904, infrared camera 906, non-destructive evaluation scanner 908, electromechanical fatigue sensor 910, positioning system 912, microelectromechanical system (MEMS) device 914, magnetic field sensor 916, ultraviolet light source and receptor 918, temperature sensor 920, pressure sensor 922, humidity sensor 924, radio frequency identification reader 926, fiber optics 928, radar 930, laser 932, ultrasonic sonar 934, and/or other suitable sensor components.

Wireless camera 902 may be any type of wireless visible light camera that may capture visual information such as still and/or moving images, for example. Wireless camera 902 may transmit the images over a wireless connection to a computer system. In an illustrative example, wireless camera 902 may be an indoor WiFi 802.11b wireless camera used for remote monitoring and surveillance over either local area networks or the Internet.

Pan/tilt/zoom camera 904 may be any camera capable of panning, tilting, and zooming in order to capture visual information such as still and/or moving images, for example. Panning may refer to the horizontal movement or rotation of the camera. Tilting may refer to the vertical movement or rotation of the camera. Zooming may refer to the ability to vary the focal length and angle of the lens of the camera.

Infrared camera 906 may form an image using infrared radiation, rather than visible light. In the illustrative example of an aircraft, infrared camera 906 may be utilized to improve an acquired image contrast ratio based on thermal intensity, thus increase the likelihood of detecting overheated items, such as aircraft brakes, bearings, gears, or components within an engine during an inspection operation, for example. In one illustrative example, infrared camera 906 may detect overheated aircraft brakes by showing a noticeable contrast to nearby and surrounding vehicle structures in relation to the aircraft brakes when viewed in the infrared spectrum. The noticeable contrast may be due to a temperature difference in the aircraft brake materials from the materials of the surrounding structures, for example.

Non-destructive evaluation scanner 908 may use electromagnetic radiation and microscopy to examine surfaces in detail. Non-destructive evaluation scanner 908 may be used to detect radiation outside the visual spectrum. The examination may often be reasonably obvious, especially when different light sources are used. For example, glancing light on a surface of a structure may reveal details not immediately obvious to sight. Type of electromagnetic radiation used may include, without limitation, X-rays, ultrasound, and/or other suitable electromagnetic radiation.

Electromechanical fatigue sensor 910 may use piezoelectric devices to provide information about the airplane structural condition that results from long term mechanical loading. Electromechanical fatigue sensor 910 may be used to detect structural frequency response information, for example.

Positioning system 912 may identify the location of the robotic machine with respect to other objects in the mission planning environment. Positioning system 912 may be any type of vision-based motion capture or radio frequency triangulation scheme based on signal strength and/or time of flight. Examples include, without limitation, the Global Positioning System, Glonass, Galileo, cell phone tower relative signal strength, and/or any other suitable system. Position may be typically reported as latitude and longitude with an error that depends on factors, such as, without limitation, ionospheric conditions, satellite constellation, signal attenuation from environmental factors, and/or other suitable factors.

Microelectromechanical system (MEMS) device 914 may be used to sense such parameters as pressure, temperature, humidity, acceleration, and rotation using the small, lightweight, and low-power nature of MEMS technologies. This also includes nanoelectromechanical systems (NEMS) which are similar to MEMS, but smaller and may be used to sense small displacements and forces at the molecular scale.

Magnetic field sensor 916 may be a sensor used to measure the strength and/or direction of the magnetic field in the vicinity of magnetic field sensor 916. Magnetic field sensor 916 may also measure variations in magnetic fields near the sensor. In one illustrative example, magnetic field sensor 916 may non-intrusively measure electric current flowing through a nearby electrical circuit.

Ultraviolet light source and receptor 918 may emit and detect ultraviolet light. Ultraviolet light may be electromagnetic radiation with a wavelength shorter than that of visible light. Ultraviolet light may be used to detect inconsistencies during an inspection operation such as, for example, fluid leaks or other residues that are difficult to identify in a visible light spectrum. Ultraviolet light source and receptor 918 may detect the bounce-back of ultraviolet light wavelengths from the emission of ultraviolet light. Ultraviolet light source and receptor 918 may transform the bounce-back wavelengths into a visible light spectrum viewable by a human eye.

Temperature sensor 920 may detect the ambient temperature of the operating environment around temperature sensor 920. In an illustrative example, temperature sensor 920 may be a thermocouple or thermistor.

Pressure sensor 922 may measure the pressure of force in an operating environment around pressure sensor 922. Pressure sensor 922 may detect the pressure of force caused by, for example, without limitation, air pressure, fluidic pressure, and/or gaseous pressure. In an illustrative example, pressure sensor 922 may be a fiber optic, mechanical deflection, strain gauge, variable capacitive, or silicon piezoresistive pressure sensor.

Humidity sensor 924 may measure relative humidity in an operating environment around humidity sensor 924. In an illustrative example, humidity sensor 924 may be a hygrometer, resistive or capacitive relative humidity sensor.

Radio frequency identification reader 926 may rely on stored data and remotely retrieve the data using devices such as radio frequency identification (RFID) tags or transponders. Radio frequency identification tags may be located, for example, without limitation, on equipment, on a structure, on a number of robotic machines, on a power source, and/or any other suitable location. In the illustrative example of an aircraft, radio frequency identification tags may be located on required equipment such as, without limitation, life vests, batteries, a black box, and/or other suitable equipment. In this illustrative example, radio frequency identification reader 926 may detect the radio frequency identification tags located on various equipment and retrieve data in order for sensor system to detect whether or not required equipment is found on and/or within the object being inspected during an inspection operation.

Fiber optics 928 may contain a collection of optical fibers that permit transmission over longer distances and at higher data rates than other forms of communications. Fiber optics 928 may be used, for example, without limitation, to measure strain and/or detect the amount of deflection in a component. Fiber optics 928 may be immune to electromagnetic interference. In an illustrative example, fiber optics may be used in a borescope to acquire images or video of hard to reach areas within an airplane structure during an inspection operation, for example.

Radar 930 may use electromagnetic waves to identify the range, altitude, direction, or speed of both moving and fixed objects. Radar 930 is well known in the art, and may be used in a time of flight mode to calculate distance to an object, as well as Doppler mode to calculate the speed of an object.

Laser 932 may emit light or electromagnetic radiation in a spatially coherent manner. Spatial coherence may refer to light that may either be emitted in a narrow, low-divergence beam, or may be converted into a narrow, low-divergence beam with the help of optical components, such as lenses for example.

Ultrasonic sonar 934 may use sound propagation on an ultrasonic frequency to measure the distance to an object by measuring the time from transmission of a pulse to reception and converting the measurement into a range using the known speed of sound. Ultrasonic sonar 934 is well known in the art and can also be used in a time of flight mode or Doppler mode, similar to radar 930.

The illustration of sensor system 900 in FIG. 9 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional sensors not shown may be included in sensor system 900. In another example, in some advantageous embodiments, sensors may be integrated together in a sensor suite, such as electromechanical fatigue sensor 910 and microelectromechanical system device 914, for example.

Figure 10:
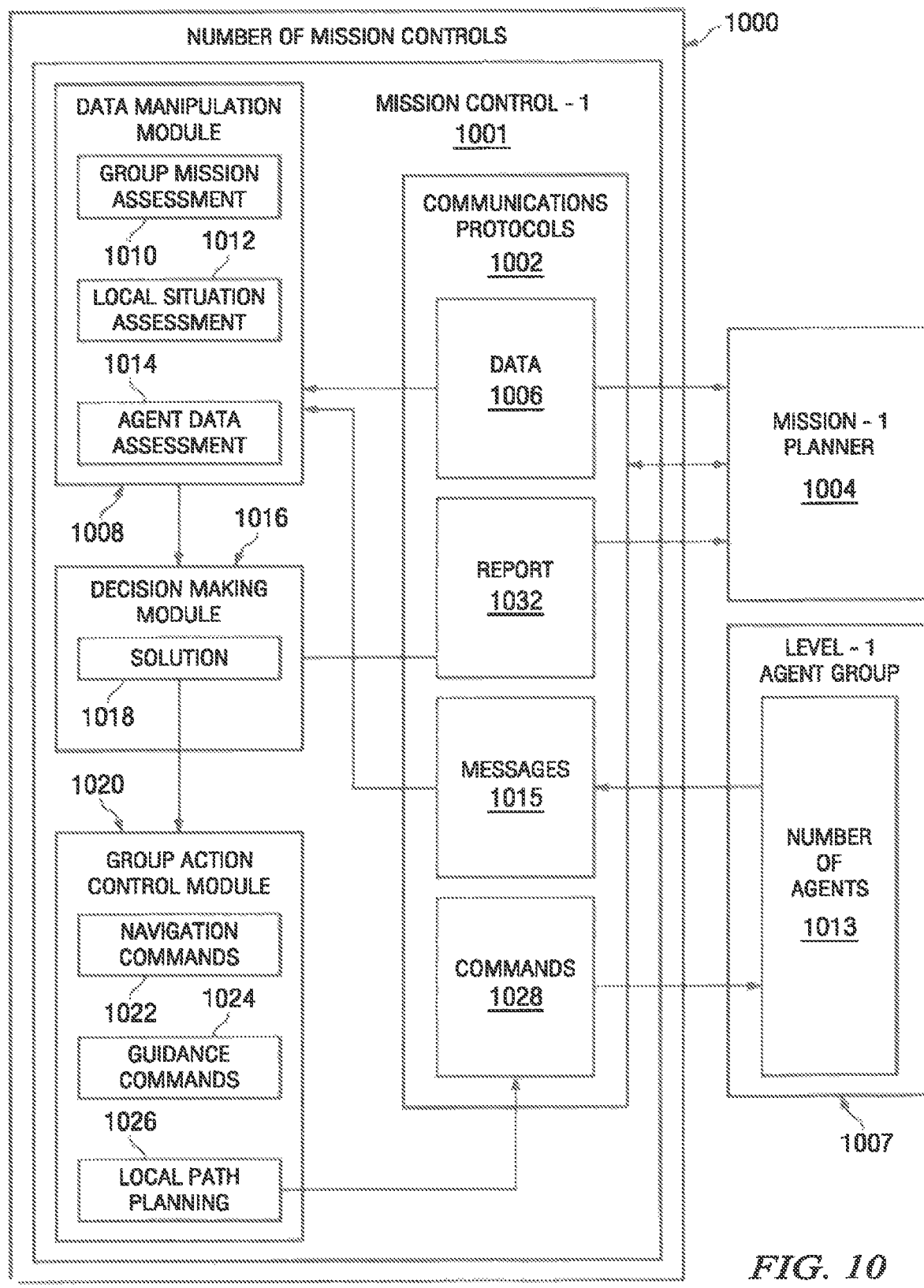
FIG. 10 is an illustration of a number of mission controls in accordance with an advantageous embodiment.

With reference now to FIG. 10, an illustration of a number of mission controls is depicted in accordance with an advantageous embodiment. Number of mission controls 1000 may be an example of one implementation of number of mission controls 324 in FIG. 3 and/or number of mission controls 526 in FIG. 5, for example.

Mission control-1 1001 may be an illustrative example of one mission control in number of mission controls 1000. Mission control-1 1001 may be an illustrative example of one implementation of mission control-1 536 in FIG. 5. Mission control-1 1001 may include communications protocols 1002, which may query and receive data from other components of a mission planning system, such as mission planner-1 1004. Data 1006 may include commands, programs, and/or information. Data 1006 may be an example of information received from mission planner-1 1004, such as information including a mission objective and a number of tasks, for example. Mission planner-1 1004 may send data 1006 to mission control-1 1001 using communication protocols 1002. Data 1006 may be used by mission control-1 1001 to execute a mission using level-1 agent group 1007. Level-1 agent group 1007 may be the agent group controlled by mission control-1 1001. Each agent group has its own mission control, such as number of agent groups 310 and number of mission controls 324 in FIG. 3. Level-1 agent group 1007 may include number of agents 1013. Number of agents 1013 may be an example of one implementation of number of agents 805 of level-1 agent group 802 in FIG. 8, for example. Number of agents 1013 may be capable of generating and sending messages 1015 during execution of a mission. Messages 1015 may contain information about the mission and/or number of agents 1013, such as, for example, without limitation, the status of the mission, the status of number of agents 1013, potential conflict in the mission, and/or any other suitable information.

Communications protocols 1002 may route information, such as data 1006 and messages 1015, to data manipulation module 1008. Data manipulation module 1008 may include, without limitation, group mission assessment 1010, local situation assessment 1012, and agent data assessment 1014. Group mission assessment 1010 may monitor the progress of a mission being executed by level-1 agent group 1007. Local situation assessment 1012 may monitor the interactions between number of agents 1013 within level-1 agent group 1007. In an illustrative example, interactions between number of agents 1013 may be, without limitation, maintaining a relative distance minimum between each agent in number of agents 1013. Agent data assessment 1014 may monitor the status of each individual agent within number of agents 1013. Status may refer to, for example, without limitation, the availability, health, functionality, task progress, location, and/or other suitable status of an individual agent.

Data manipulation module 1008 may process and store the information collected during the monitoring activities of group mission assessment 1010, local situation assessment 1012, and agent data assessment 1014. Data manipulation module 1008 may continuously monitor level-1 agent group 1007 for conflicts, and may send any identified conflict to decision making module 1016. Decision making module 1016 may gather the information collected by data manipulation module 1008 and may determine whether the mission is executing without conflict or whether a conflict has developed during execution of the mission. If a conflict has developed during execution of the mission, decision making module 1008 may run a negotiation algorithm to identify and generate a local solution to the conflict, such as solution 1018. If decision making module 1008 is able to generate solution 1018, decision making module 1008 may send solution 1018 to group action control module 1020.

Group action control module 1020 may generate commands 1028 to send to number of agents 1013 in level-1 agent group 1007 based on solution 1018. Group action control module 1020 may include navigation commands 1022, guidance commands 1024, and local path planning 1026. For example, local situation assessment 1012 may identify one or more agents in number of agents 1013 that may not be maintaining minimum distance separation. Solution 1018 may include instructions used by group action control module 1020 for generating navigation commands 1022 to navigate one or more agents to an appropriate distance separation, for example.

If decision making module 1016 is not able to identify a solution for the conflict identified, decision making module 1016 may generate report 1032 to send to mission planner-1 1004. Mission control-1 1001 may then wait for further commands and/or solutions from mission planner-1 1004 in order to update commands 1028 to level-1 agent group 1007.

The illustration of number of mission controls 1000 in FIG. 10 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, additional components not shown may be included in number of mission controls 1000.

Figure 11:
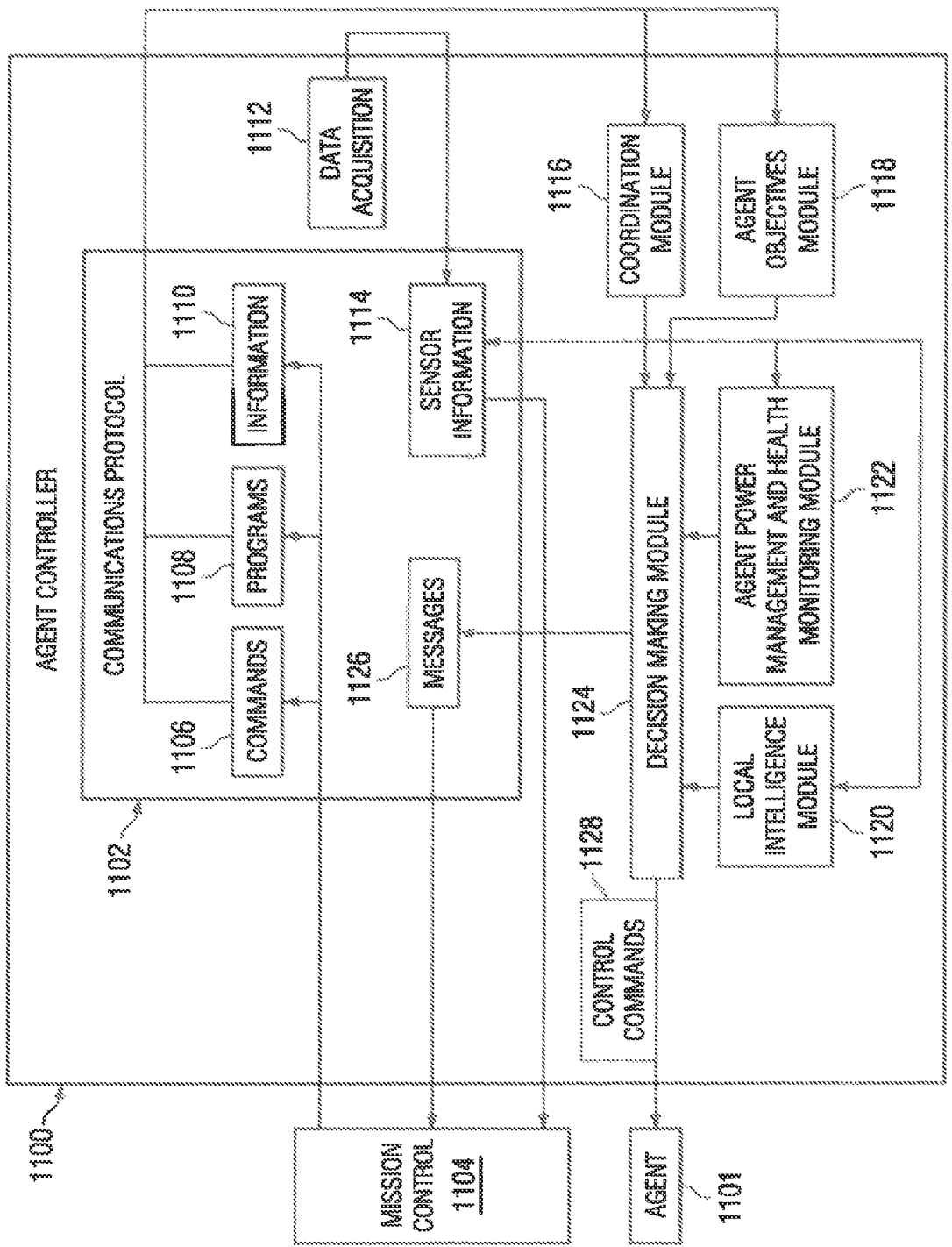
FIG. 11 is an illustration of an agent controller in accordance with an advantageous embodiment.

With reference now to FIG. 11, an illustration of an agent controller is depicted in accordance with an advantageous embodiment. Agent controller 1100 may be an example of one implementation of agent controller 832 in FIG. 8.

Agent controller 1100 may control agent 1101. Agent controller 1100 may include communications protocol 1102. Communications protocol 1102 may handle incoming commands 1106, programs 1108, and information 1110 coming from mission control 1104. Communications protocol 1102 may also handle outgoing sensor information 1114 and messages 1126 being sent to mission control 1104. Data acquisition 1112 may receive sensor information from a sensor system associated with agent 1101, such as sensor system 812 in FIG. 8, and send sensor information 1114 to mission control 1104 using communications protocol 1102. Sensor information 1114 may include, without limitation, information about an operating environment, structure, mission objective, resource, agent state, and/or other suitable sensor information.

Coordination module 1116 may decode group requirements for agent 1101 sent from mission control 1104 using commands 1106, programs 1108, or information 1110. In an illustrative example, commands 1106 may be instructions to "inspect a wing" of an aircraft structure or "maintain a formation" with other agents in an agent group, for example.

Agent objectives module 1118 may decode individual requirements for agent 1101 based on a mission plan. In an illustrative example, individual requirements may be "follow this trajectory or waypoint" or "go from location A to location B" for example.

Local intelligence module 1120 may detect information from other agents nearby, such as other agents in level-1 agent group 1007 controlled by mission control-1 1001 for example. Information detected by local intelligence module 1120 may include, without limitation, the proximity of a number of agents to agent 1101, the direction in which a number of agents are moving, and/or other suitable information. Local intelligence module 1120 may use sensor information 1114 to detect information from other agents. For example, sensor information 1114 may include data from wireless camera 902, infrared camera 906, positioning system 912, and other sensor components of sensor system 900 in FIG. 9, which may be implemented on agent 1101 for example.

Agent power management and health monitoring module 1122 may manage the power and health status of agent 1101. Power and health status may include, for example, without limitation, measuring and tracking available energy, such as battery state-of-charge for example. Agent power management and health monitoring module 1122 may provide information to decision making module 1124 on when a power source needs recharging or refueling, for example. Agent power management and health monitoring module 1122 may manage health sensors of a sensory system on agent 1101, such as sensor system 900 in FIG. 9, for example. Agent power management and health monitoring module 1122 may manage data and use data-driven or model-based prognostic and/or diagnostic algorithms to determine the health status of agent 1101. Decision making module 1124 may receive information from each of coordination module 1116, agent objectives module 1118, local intelligence module 1120, and agent power management and health monitoring module 1122. Decision making module 1124 may use the information received to determine whether a given mission, sent by mission control 1104, may be achieved. Control commands 1128 may include path planning, guidance and actuator control data. Control commands 1128 may provide control of sensors of agent 1101, such as, without limitation, turning a sensor on or off, controlling the orientation of a pan/tilt/zoom camera, or setting other sensor parameters, for example. Control of sensors associated with agent 1101 may be used to detect environmental information in an environment around agent 1101, for example. If decision making module 1124 determines a mission can be achieved, decision making module 1124 may send control commands 1128 to agent 1101 with the corresponding commands received from mission control 1104. If decision making module 1124 determines the mission is not achievable by agent 1101, decision making module 1124 may send messages 1126 back to mission control 1104 indicating the conflict or issue with the mission sent by mission control 1104. Agent controller 1100 may then wait for new commands from mission controller 1104 before sending any control commands to agent 1101.

The illustration of agent controller 1100 in FIG. 11 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, additional components not shown may be included in agent controller 1100.

Figure 12:
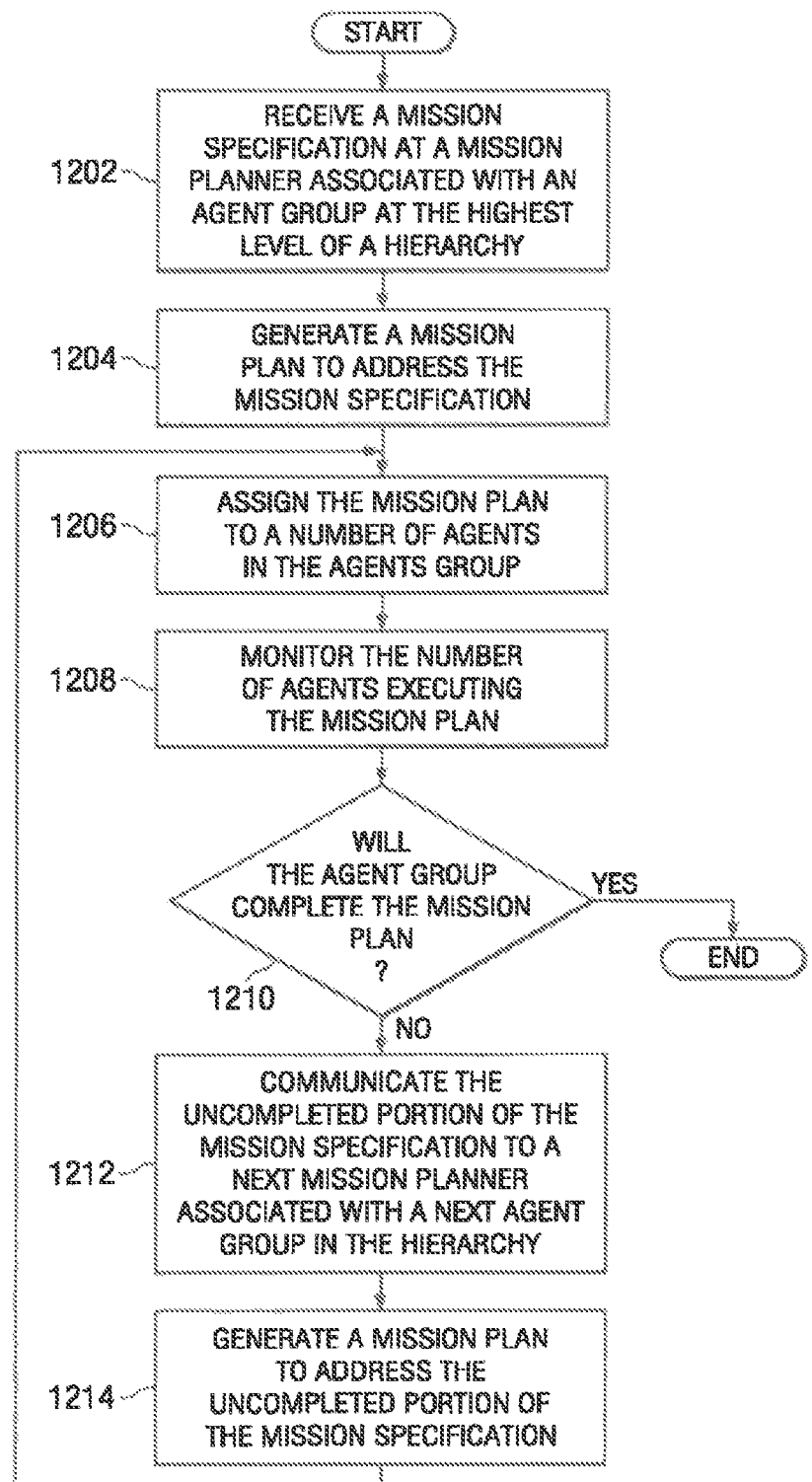
FIG. 12 is an illustration of a flowchart of a process for hierarchical mission management in accordance with an advantageous embodiment.

With reference now to FIG. 12, an illustration of a flowchart of a process for hierarchical mission management is depicted in accordance with an advantageous embodiment. The process in FIG. 12 may be implemented by a component such as mission planning system 304 in FIG. 3 and/or mission planning system 500 in FIG. 5.

The process begins by receiving a mission specification at a mission planner associated with an agent group at the highest level of a hierarchy (operation 1202). The mission planner may be the mission planner associated with the highest level of hierarchy in a number of agent groups, such as mission planner-1 604 associated with level-1 agent group 620 in FIG. 6, for example. The process generates a mission plan to address the mission specification (operation 1204). The mission plan may be generated by an arbitrator of the first mission planner, such as mission plan 618 generated by arbitrator 616 in FIG. 6, for example. The process then assigns the mission plan to a number of agents in the agent group (operation 1206). The process may transmit the mission plan using a communication system, such as communication system 548 in FIG. 5, for example. The mission plan may be received by a mission control for the agent group, such as mission control-1 626 in FIG. 6, for example.

Next, the process monitors the number of agents executing the mission plan (operation 1208). The process may monitor the number of agents for agent change, environmental change, new information, and/or any other information that may initiate a determination of whether the current agent group will successfully fulfill the requirements of the mission specification as set forth in the mission plan. The process determines whether the agent group will complete the mission plan (operation 1210). If the process determines the agent group will not complete the mission plan, the process communicates the uncompleted portion of the mission specification to a next mission planner associated with a next level agent group in the hierarchy (operation 1212). The next mission planner may be, for example, mission planner-2 606 associated with level-2 agent group 640 in FIG. 6. The process generates a mission plan to address the uncompleted portion of the mission specification (operation 1214) and returns to operation 1206, iteratively repeating the process in FIG. 12 until the mission specification is fulfilled.

Figure 13:
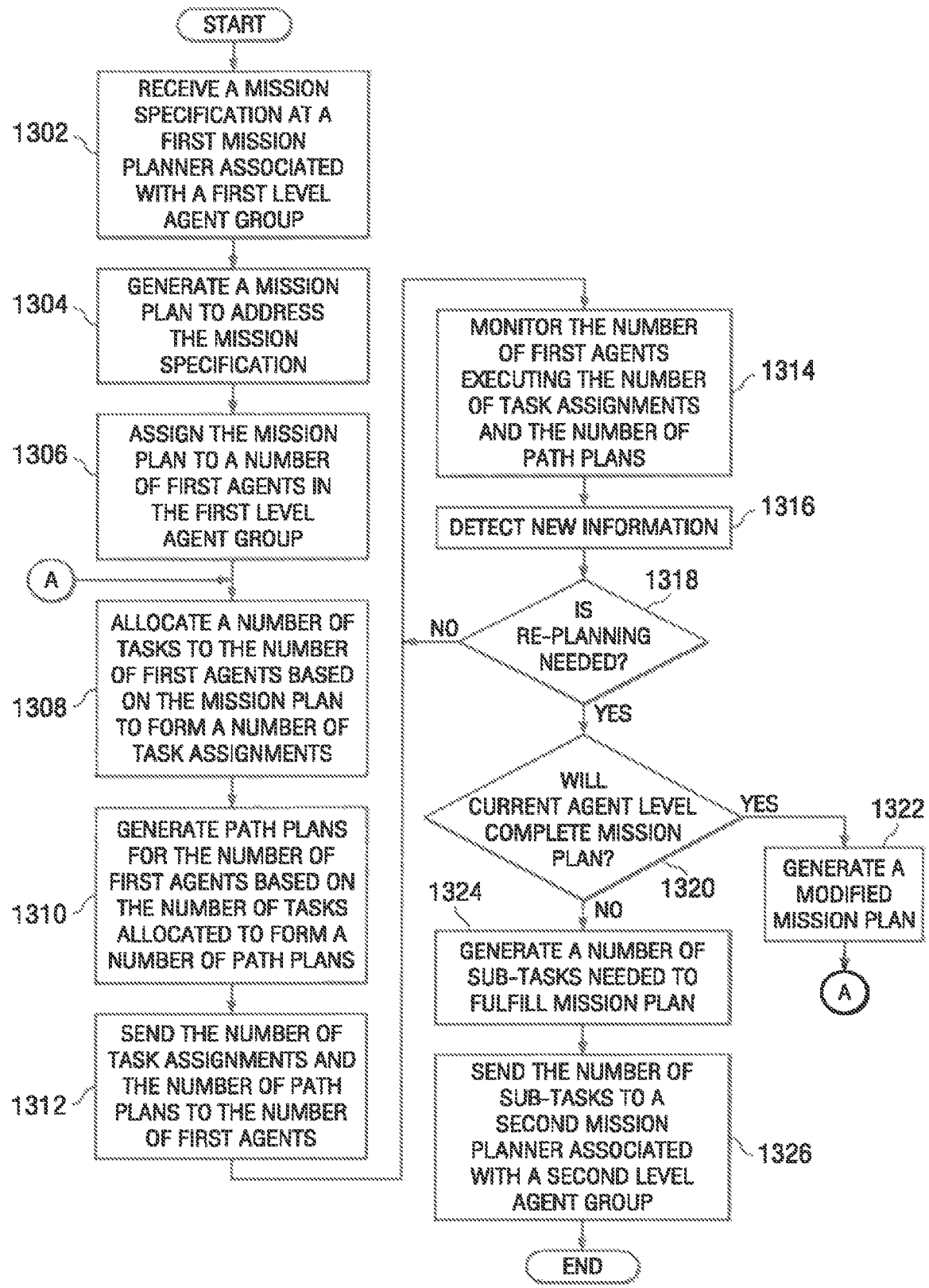
FIG. 13 is an illustration of a flowchart of a process for autonomous hierarchical mission management in accordance with an advantageous embodiment.

With reference now to FIG. 13, an illustration of a flowchart of a process for autonomous hierarchical mission management is depicted in accordance with an advantageous embodiment. The process in FIG. 13 may be implemented by a component such as mission planner-1 604 in FIG. 6, for example.

The process begins by receiving a mission specification at a first mission planner associated with a first level agent group (operation 1302). The mission specification may be received from an operator, such as operator 502 in FIG. 5, or a plurality of databases, such as plurality of databases 508 in FIG. 5, for example. The process generates a mission plan to address the mission specification (operation 1304). Next, the process assigns the mission plan to a number of first agents in the first level agent group (operation 1306). The process then allocates a number of tasks to the number of first agents based on the mission plan to form a number of task assignments (operation 1308).

Next, the process generates a number of path plans for the number of first agents based on the number of tasks allocated (operation 1310). A path plan may be generated for each agent in an agent group, and the path plan generated for an agent may be associated with the number of tasks allocated to that agent. The process sends the number of task assignments and the number of path plans to the number of first agents (operation 1312). The process then monitors the number of first agents executing the number of task assignments and the number of path plans (operation 1314).

The process detects new information (operation 1316). The new information may be detected by a sensor system on one or more of the number of first agents or by some other input, such as operator input, for example. The new information may be information about an agent, an environment in which an agent is currently executing a task, and/or any other suitable information. The process then determines whether a re-planning of the mission plan is needed (operation 1318). If the determination is made that no re-planning is needed, the process returns to operation 1314. If the process determines that the re-planning of the mission plan is needed, the process then determines whether the current agent level will complete the mission plan (operation 1320).

If a determination is made that the current agent level will complete the mission plan, the process generates a modified mission plan (operation 1322) and returns to operation 1308. If a determination is made that the current agent level will not complete the mission plan, the process then generates a number of sub-tasks needed to fulfill the mission plan (operation 1324). The process sends the number of sub-tasks to a second mission planner associated with a second level agent group (operation 1324), with the process terminating thereafter.

The process illustrated in FIG. 13 may be iteratively executed in each successive mission planner down the hierarchy until the mission specification is fulfilled or until no lower agent level group is available in the hierarchy.

Figure 14:
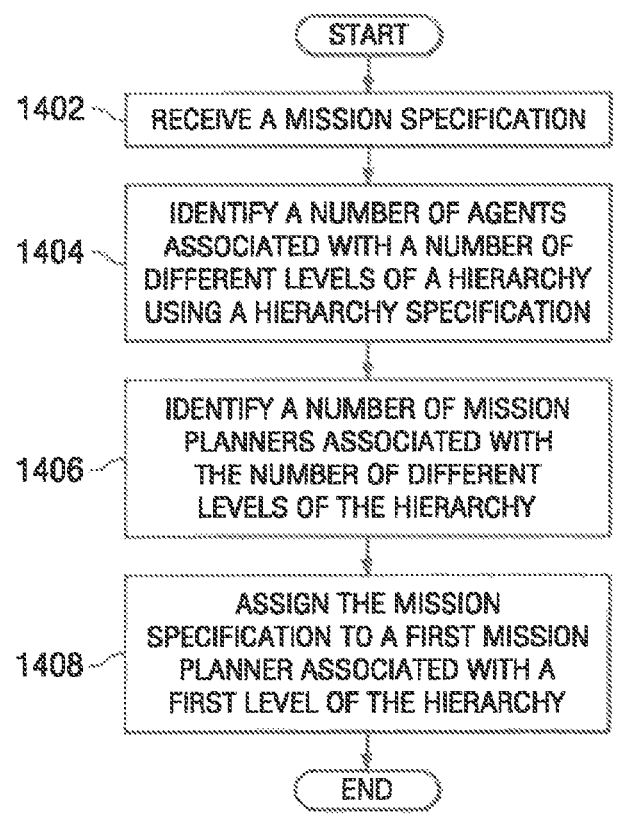
FIG. 14 is an illustration of a flowchart of a process for hierarchical mission management in accordance with an advantageous embodiment.

With reference now to FIG. 14, an illustration of a flowchart of a process for hierarchical mission management is depicted in accordance with an advantageous embodiment. The process in FIG. 14 may be implemented by a component such as mission planning system 304 in FIG. 3, for example.

The process begins by receiving a mission specification (operation 1402). The process identifies a number of agents associated with a number of different levels of a hierarchy using a hierarchy specification (operation 1404). The hierarchy specification includes a description of agent capabilities for each of the number of agents associated with the number of different levels of hierarchy, as well as identifying the level in the hierarchy to which each agent in the number of agents is assigned.

Next, the process identifies a number of mission planners associated with the number of different levels of the hierarchy (operation 1406). The process then assigns the mission specification to a first mission planner associated with a first level of the hierarchy (operation 1408), with the process terminating thereafter. In assigning the mission specification to a mission planner, the process may allocate the number of tasks from the mission specification to a number of first agents associated with the first level of the hierarchy, for example.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for hierarchical mission management, the system comprising:
    mission planners, including one or more processors, associated with agent groups including one or more agents, wherein the one or more agents are one or both of robots or machines, the mission planners configured to, by the one or more processors, plan missions and allocate resources for the missions, and the agent groups configured to execute the missions planned by the mission planners, the mission planners further configured to generate a mission plan for the one or more agents in an associated agent group, the mission planners further configured to monitor the one or more agents executing the tasks by receiving information from a number of sensors associated with the one or more agents, wherein the one or more sensors include a camera configured to acquire an image of an aircraft with respect to leak of a fluid using ultraviolet light to detect the fluid, wherein the one or more processors are further configured to generate control commands based on monitored sensor data and the mission plan, and transmit the control commands to one or both of the robots or the machines to implement the missions via physical paths and derivative control commands;
    a data processing system configured to execute the mission planners; and
    a communication system configured to provide communication between the mission planners.

2. The system of claim 1, further comprising a hierarchy specification defining hierarchical levels associated with the mission planners and the agent groups.

3. The system of claim 2, wherein the hierarchy specification further comprises a description of the one or more agents and an associated hierarchy level assigned to each of the one or more agents.

4. The system of claim 2, wherein the hierarchy specification comprises maintenance of the aircraft.

5. The system of claim 1, wherein each of the mission planners comprises:
    an arbitrator configured to generate the mission plan for the one or more agents in the associated agent group, the mission plan having tasks;
    a task allocator configured to allocate the tasks to the one or more agents; and
    a path planner configured to plan the physical paths associated with the tasks allocated to the one or more agents.

6. The system of claim 5, wherein the arbitrator is further configured to monitor the one or more agents executing the tasks.

7. The system of claim 5, wherein the mission plan is for a first maintenance operation, wherein the tasks include inspection of the leak of fluid in the aircraft, and wherein the physical paths are related to the aircraft.

8. The system of claim 7, wherein the one or more agents are configured to receive the physical paths related to the aircraft.

9. The system of claim 1, further comprising one or more databases storing a mission specification, wherein the mission planners receive the mission specification from the one or more databases.

10. The system of claim 9, wherein the mission specification is for maintenance of an aircraft.

11. A method for hierarchical mission management, the method comprising:
    associating, by a computer system, mission planners, including one or more processors, with agent groups including one or more agents, wherein the one or more agents are one or both of robots or machines;
    planning, by the one or more processors of the mission planners, missions;
    allocating, by the one or more processors of the mission planners, resources for the missions;
    monitoring, by the one or more processors, the one or more agents by receiving information from a number of sensors associated with the one or more agents, wherein the one or more sensors include a camera configured to acquire an image of an aircraft with respect to leak of a fluid using ultraviolet light to detect the fluid;
    generating, by the one or more processors, control commands based on monitored sensor data and the missions;
    transmitting, by the one or more processors, the control commands to one or both of the robots or the machines of the agent groups to implement the missions via physical paths and derivative control commands;
    executing, by the agent groups including the or both of the robots or machines, the missions planned by the mission planners;
    executing, by a data processing system, the mission planners; and
    providing, by a communication system, communication between the mission planners.

12. The method of claim 11, further comprising defining, by a hierarchy specification, hierarchical levels associated with the mission planners and the agent groups.

13. The method of claim 12, further comprising defining, by the hierarchy specification, a description of the one or more agents and an associated hierarchy level assigned to each of the one or more agents.

14. The method of claim 12, wherein the hierarchy specification comprises maintenance of the aircraft.

15. The method of claim 11, further comprising:
    generating, by an arbitrator, a mission plan for the one or more agents in an associated agent group, the mission plan having tasks;
    allocating, by a task allocator, the tasks to the one or more agents; and
    planning, by a path planner, the physical paths associated with the number of tasks allocated to the one or more agents.

16. The method of claim 15, wherein the mission plan is for a first maintenance operation, wherein the tasks include inspection of the leak of fluid in the aircraft, wherein the physical paths are related to the aircraft, and wherein the method further comprises receiving, by the one or more agents, the physical paths related to the aircraft.

17. The method of claim 15, further comprising monitoring, by the arbitrator, the one or more agents executing the tasks.

18. The method of claim 11, further comprising:
storing, in one or more databases, a mission specification; and
receiving, by the mission planners, the mission specification from the one or more databases.

19. The method of claim 18, wherein the mission specification is for maintenance of the aircraft.

20. A system for hierarchical mission management, the system comprising:
mission planners, including one or more processors, associated with agent groups including one or more agents, wherein the one or more agents are one or both of robots or machines, the mission planners configured to, by the one or more processors, plan missions and allocate resources for the missions, and the agent groups configured to execute the missions planned by the mission planners, wherein the one or more processors are further configured to generate control commands based on monitored sensor data and a mission plan, and transmit the control commands to one or both of the robots or the machines to implement the missions via physical paths and derivative control commands, wherein each of the mission planners comprises:
an arbitrator configured to generate the mission plan for the one or more agents in an associated agent group, the mission plan having tasks, wherein the mission plan is for a first maintenance operation, wherein the tasks include inspection of fluid leaks in the aircraft, wherein the arbitrator receives information from the number of sensors associated with the one or more agents, wherein the one or more sensors include a camera configured to acquire an image of the aircraft with respect to the fluid leaks using ultraviolet light to detect the fluid, wherein the arbitrator is further configured to monitor the one or more agents executing the tasks;
a task allocator configured to allocate the tasks to the one or more agents; and
a path planner configured to plan the physical paths associated with the tasks allocated to the one or more agents, wherein the physical paths are related to the aircraft, wherein the one or more agents are configured to receive the physical paths related to the aircraft;
a hierarchy specification including maintenance of an aircraft, and defining hierarchical levels associated with the mission planners and the agent groups, a description of the one or more agents, and an associated hierarchy level assigned to each of the one or more agents;
a data processing system configured to execute the mission planners;
one or more databases storing a mission specification, wherein the mission planners receive the mission specification from the one or more databases, wherein the mission specification is for maintenance of the aircraft; and
a communication system configured to provide communication between the mission planners.

* * * * *